United States Patent [19]

Kinoshita et al.

[11] Patent Number: 5,204,567
[45] Date of Patent: Apr. 20, 1993

[54] BRUSHLESS MOTOR WITH RESILIENT SHAFT END-PLAY ABSORBER

[75] Inventors: Tsutomu Kinoshita, Kosai; Tetsurou Shinmura, Toyohashi, both of Japan

[73] Assignee: Asmo Co., Ltd., Kosai, Japan

[21] Appl. No.: 905,089

[22] Filed: Jun. 24, 1992

Related U.S. Application Data

[63] Continuation of Ser. No. 725,971, Jul. 5, 1991, abandoned.

[30] Foreign Application Priority Data

Jul. 9, 1990 [JP] Japan ................ 2-73107[U]

[51] Int. Cl.$^5$ ............... H02K 05/24; H02K 05/16; H02K 07/08; F16C 27/08
[52] U.S. Cl. ............................ 310/90; 310/51; 384/223
[58] Field of Search ............. 310/51, 67 R, 89, 90, 310/90.5; 384/223, 420, 425

[56] References Cited

U.S. PATENT DOCUMENTS

| | | | |
|---|---|---|---|
| 3,749,457 | 7/1973 | Latussek et al. | 384/223 |
| 3,845,339 | 10/1974 | Merkle et al. | 310/156 |
| 4,050,130 | 9/1977 | Pitner | 29/149.5 R |
| 4,452,541 | 6/1984 | Carpenter | 384/223 |
| 4,588,912 | 5/1986 | Shinmura et al. | 310/68 R |
| 4,963,076 | 10/1990 | Fleishmann et al. | 417/423.7 |

FOREIGN PATENT DOCUMENTS

| | | |
|---|---|---|
| 5930656 | 2/1981 | Japan . |
| 60-91853 | 5/1985 | Japan . |
| 61-54860 | 3/1986 | Japan . |
| 62-165739 | 9/1987 | Japan . |
| 63-126613 | 3/1988 | Japan . |

*Primary Examiner*—Steven L. Stephan
*Assistant Examiner*—D. R. Haszko
*Attorney, Agent, or Firm*—Stetina and Brunda

[57] ABSTRACT

A brushless motor is provided with a rigid resin member that faces one end of the drive shaft with a predetermined gap therebetween. The rigid member is positioned to be struck by the end of the drive shaft when the drive shaft vibrates. The impact of the collision is absorbed by the elastic deformation of a resilient member that supports the rigid member. This prevents noise from being generated by vibrations of the drive shaft.

2 Claims, 3 Drawing Sheets

BRUSHLESS MOTOR WITH RESILIENT SHAFT END-PLAY ABSORBER

This is a continuation of copending application Ser. No. 07/725,971 filed on Jul. 5, 1991 now abandoned.

This application claims the priority of Japanese Utility Model Application No. 273,107 filed on Jul. 9, 1990.

BACKGROUND OF THE INVENTION

1. Field of the Invention

The present invention generally relates to a brushless motor. More specifically, the present invention pertains to a brushless motor with an improved bearing for supporting the rotor drive shaft.

2. Description of the Related Art

Brushless motors do not require brush replacement and are relatively compact. Therefore, they are used in many applications where space is limited such as for the fan motor in a temperature sensor provided in a sections of vehicles which are hard to access.

Such a brushless motor is disclosed, for example, in Japanese Unexamined Patent Publication Nos. Sho 60-91853 and Sho 61-54860. This brushless motor has a motor housing 32 formed by an upper case 30 and a lower case 31 made of a magnetic material as illustrated in FIG. 3. A rotor 34 is provided in the housing 32. A pair of magnets 33 are symmetrically arranged about a drive shaft 36 at a position below the rotor 34. The magnets 33 are normally attracted by the lower case 31, therefore, when the rotor 34 is at rest, it is held at a stable position. Actuating coils 35 are arranged in the lower case 31 to face the magnets 33. To drive the motor, the actuating coils 35 are sequentially excited to rotate the rotor 34 and the drive shaft 36.

The structure of the bearing of the drive shaft 36 will now be explained. A downward extending recess 37 is formed in the center of the lower case 31, and a resin plate 38 is set against the internal wall of the lower case 31. The lower end portion of the drive shaft 36 is supported in the recess 37 by a radial bushing 39 that sits on the resin plate 38.

A bore 42 is formed in the center of the upper case 30. An anchor nut 43 is press fit in the bore 42. An adjust bolt 44 is screwed into the anchor nut 43 and extends into the housing 32. The bolt's lower end is secured onto the upper surface of a box-shaped support case 40. The support case 40 has a thrust bushing 41 disposed therein. The thrust bushing 41 is configured to provide tiny clearances 45. Supported by the bushing 41 is the upper portion of the drive shaft 36 which is inserted from the bottom of the support case 40. As the length of the engagement of the adjust bolt 44 in the anchor nut 43 varies, the relative positions of the clearances 45 to the bushing 41 in the support case 40 adjusts the play of the drive shaft 36 in the direction of thrust.

In a compact motor outputting a small torque, however, the friction between the drive shaft 36 and the bushing 41 causes the rotor 4 to rotate at a lower velocity than the desired velocity. In order to keep this velocity differential at a minimum, tiny clearances are formed to avoid a large amount of play in the drive shaft 36 in the thrust direction.

However, as the vibration of the vehicle is transmitted to the motor, the clearance between the bushing 41 and the shaft 36 cause the position of the drive shaft 36 to fluctuate gradually against the attracting force between the magnet 33 and lower case 31. Accordingly, the upper end of the drive shaft 36 hits the bushing 41, thus causing noise.

SUMMARY OF THE INVENTION

It is therefore an object of the present invention to provide a brushless motor, which ensures high working efficiency.

To achieve the foregoing and other objects and in accordance with the purpose of the present invention, a brushless motor is provided. The motor includes a housing that accommodates a rotor and a drive shaft. A relatively rigid thrust receiving member faces a first end of the drive shaft with a predetermined gap therebetween. The thrust receiving member is positioned to be struck by the first end of the drive shaft when the drive shaft vibrates. An impact absorbing resilient member absorbs the impact of the drive shaft when the drive shaft strikes thrust receiving member.

In a preferred embodiment, the housing includes a lower casing that includes a magnetic material. The rotor also carries a magnet thereon. The magnet and the magnet material cooperate to bias the drive shaft away from the thrust receiving member to help keep the drive shaft separated from the thrust receiving member when the drive shaft does not vibrate.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiment together with the accompanying drawings in which:

DETAILED DESCRIPTION OF THE PREFERRED EMBODIMENT

Figure 1:
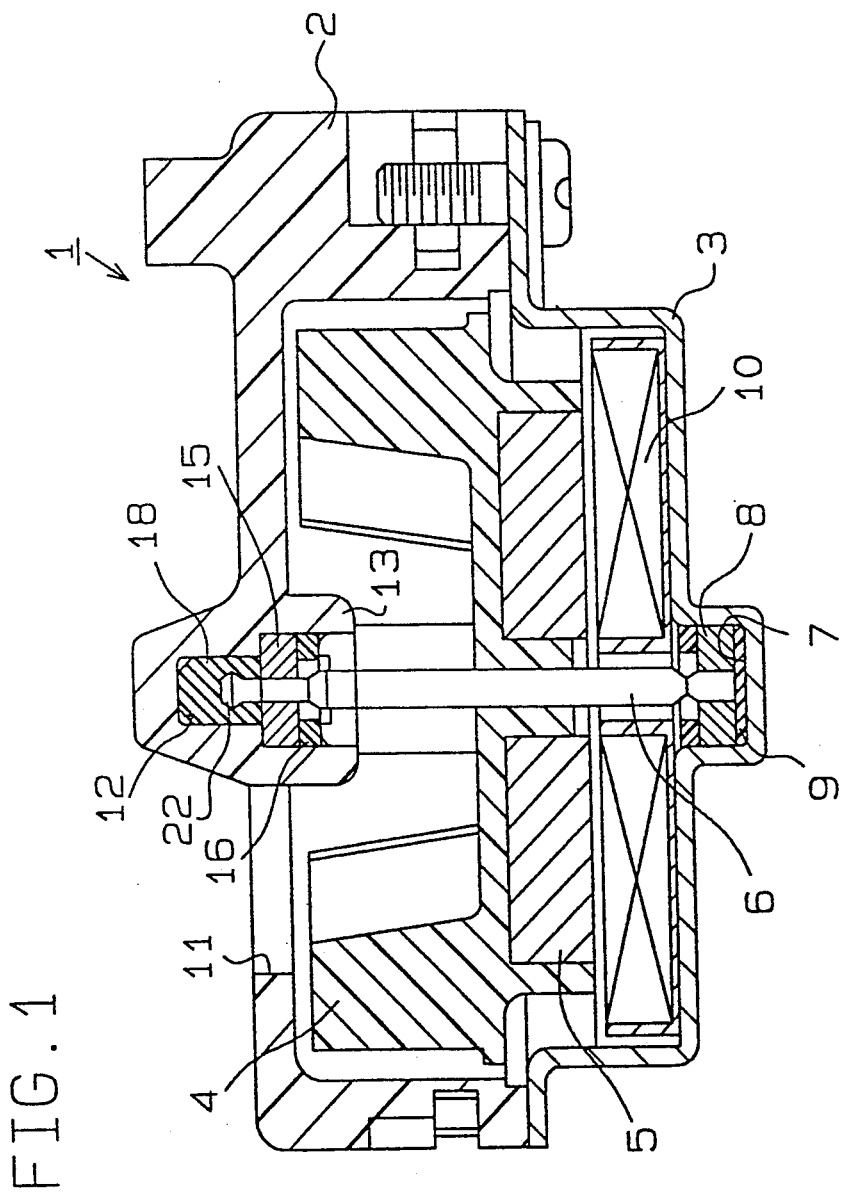
FIG. 1 is a cross section illustrating a brushless motor according to the present invention.

A preferred embodiment of the present invention will now be described referring to FIGS. 1 and 2. As seen in FIG. 1, a motor housing 1 for a fan motor provided in an inaccessible section of the vehicle, includes an upper case 2 made of a synthetic resin material and a lower case 3 made of a magnetic material.

A rotor 4 is disposed in the housing 1. The rotor 4 has multiple circumferentially spaced magnets 5 embedded in the bottom thereof at equal intervals. A drive shaft 6 is secured to the center of the rotor 4. The lower end of the drive shaft 6 extends into a recess 7 that opens upward in the middle of the lower case 3. A resin plate 9 is set at the bottom of the recess 7 and a bushing 8 is set thereover. The bottom of the drive shaft 36 is rotatably supported by the bushing 8. When the motor rotates, the bushing 8 serves as a thrust and radial bearing.

The rotor 4 and drive shaft 6 are normally held still by the attractive force acting between the magnets 5 and the lower case 3. Multiple solenoid coils 10 are arranged on the inner wall of the lower case 3 to face the magnets 5. When the actuating coils 10 are sequentially excited, a driving attractive force greater than the aforementioned attractive force is generated, thus rotating the rotor 4 and the drive shaft 6.

Multiple circumferentially spaced openings 11 are formed along the top surface of the uppercase 2 to provide air ducts. An upward extending projection in the center of the openings 11 forms an upwardly extending recess 12. The peripheral portion of the opening of the recess 12 projects downward to form a ring wall 13 having a larger diameter than the recess 12. The upper end of the drive shaft 6 is inserted in the ring wall 13.

Figure 2:
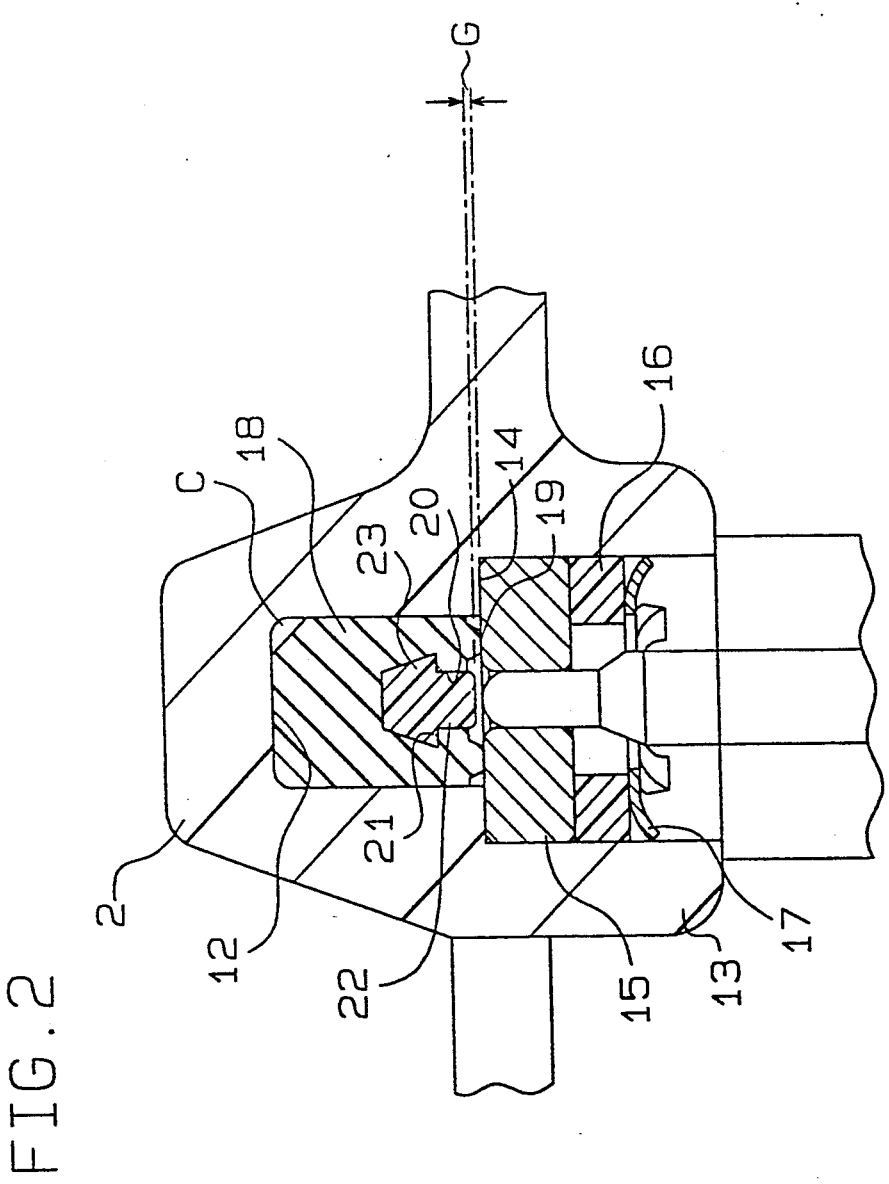
FIG. 2 is an enlarged cross section showing the bearing structure at the upper end of the drive shaft of the brushless motor according to the present invention.
Figure 3:
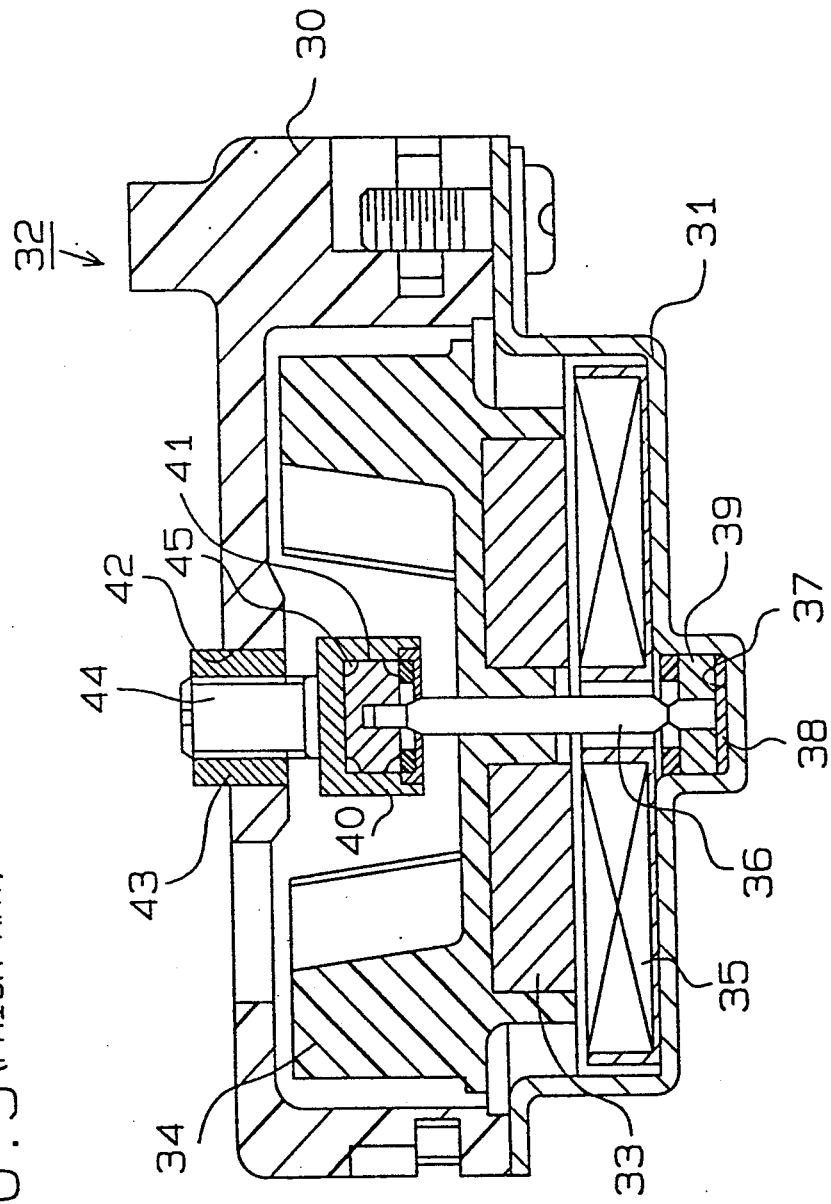
FIG. 3 is a cross section of a conventional brushless motor.

As shown in FIG. 2 in particular, a bushing 15 is fitted against a shoulder 14 formed at the boundary between the recess 12 and the ring wall 13, and is held through a felt spacer 16 by a lock washer 17 in such a way that the bushing 15 will not come off in normal conditions. The bushing 15 rotatably supports the upper end of the drive shaft 6 and serves as a thrust bearing when the motor is driven.

Fitted into the recess 12 is a resilient member 18, whose top has a plurality of cutaways to form clearances C to allow for deformation. Multiple support legs 19 protrude from the bottom surface of the resilient member 18, the bottom of each support leg 19 abutting on the bushing 15. The support legs 19, therefore, form a slight gap between the bottom of the resilient member 18 and the upper face of the bushing 15.

A bore 20 is formed in the bottom of the resilient member 18. The top portion of the bore 20 is formed larger in diameter than the lower portion, thus providing a step 21. A thrust receiving plug 22 made of a hard synthetic resin material is pushed into the bore 20. The thrust receiver 22 has a large diameter head portion 23 at its upper end. The head is enlarged in the circumferential direction. The head 23 engages with the step 21 to keep the plug 22 from being removed from the bore 20. The plug 22 is designed so that its bottom end protrudes a little from the bore 20. The bottom of the plug 22 faces the top of the drive shaft 6 with a gap G therebetween.

In the above-described brushless motor, when the actuating coils 10 are excited to rotate the rotor 4, the drive shaft 6 is rotated without contacting the plug 22 with the gap G therebetween, while being supported by the bushing 15. The tip of the drive shaft 6 will not therefore wear out. Further, the drive shaft 6 does not contact the plug 22 in the normal driving of the motor, thus preventing the rotational efficiency from dropping due to the friction.

If a vertical vibration is externally applied to the rotor 4 during the operation of the motor, the drive shaft 6 together with the rotor 4 are forced to shift vertically, and the top of the drive shaft 6 hits the bottom of the thrust receiving plug 22. This impact is, however, absorbed by elastic deformation of the resilient member 18, and noise is not generated.

Although only one embodiment of the present invention has been described herein, it should be apparent to those skilled in the art that the present invention may be embodied in many other specific forms without departing from the spirit or the scope of the invention.

What is claimed is:

1. A brushless motor comprising:
   a housing including an upper case and a lower case, the lower case being made of a magnetic material;
   a rotor and a drive shaft rotatable together with the rotor, the rotor and drive shaft being positioned within the housing, the rotor having a magnet thereon that attracts the lower case with an attracting force, the drive shaft having first and second ends, the first end disposed within the upper case and the second end disposed within the lower case;
   an impact absorbing means including a resilient member attached to an inner wall of the upper case in a position generally opposite to the first end of the drive shaft; and
   a thrust receiving means including a rigid member attached to the resilient member and facing the first end of the drive shaft, there being a predetermined gap between the rigid member and the first end of the drive shaft, the rigid member being positioned to be hit by the first end of the drive shaft only when the drive shaft vibrates whereby the resilient member deforms to absorb the impact of the drive shaft striking the rigid member; and
   whereby the attracting force is applied to the drive shaft to bias the drive shaft in the direction of the lower case to help keep the drive shaft separated from the rigid member when the drive shaft does not vibrate.

2. A brushless motor according to claim 1, wherein the first end of the drive shaft has a peripheral surface supported by a bearing.

* * * * *